(12) United States Patent
Beynet et al.

(10) Patent No.: US 8,784,004 B2
(45) Date of Patent: Jul. 22, 2014

(54) SUBSEA DISPERSANT INJECTION SYSTEMS AND METHODS

(75) Inventors: Pierre Albert Beynet, Houston, TX (US); Patrick Michael Cargol, Jr., The Woodlands, TX (US); Michael Duggan Drieu, Magnolia, TX (US); Jonathan Eryl Rogers, The Woodlands, TX (US); Stanley Silva, Sugar Land, TX (US)

(73) Assignee: BP Corporation North America Inc., Houston, TX (US)

( * ) Notice: Subject to any disclaimer, the term of this patent is extended or adjusted under 35 U.S.C. 154(b) by 0 days.

(21) Appl. No.: 13/455,724

(22) Filed: Apr. 25, 2012

(65) Prior Publication Data

US 2013/0022400 A1 Jan. 24, 2013

Related U.S. Application Data

(60) Provisional application No. 61/479,888, filed on Apr. 28, 2011.

(51) Int. Cl.
*E02B 15/04* (2006.01)

(52) U.S. Cl.
USPC .......................................................... 405/60

(58) Field of Classification Search
USPC .............................................. 405/60; 166/364
See application file for complete search history.

(56) References Cited

U.S. PATENT DOCUMENTS

| | | | | |
|---|---|---|---|---|
| 3,643,741 A | * | 2/1972 | Miranda | 405/60 |
| 4,420,400 A | * | 12/1983 | Weitzen | 210/710 |
| 4,700,662 A | * | 10/1987 | Fasnacht et al. | 239/552 |
| 4,899,940 A | * | 2/1990 | Leaver | 239/526 |
| 5,381,962 A | * | 1/1995 | Teague | 239/526 |
| 5,406,019 A | * | 4/1995 | Dean | 405/60 |
| 5,618,468 A | | 4/1997 | Canevari et al. | |
| 5,728,320 A | | 3/1998 | Fiocco et al. | |
| 5,753,127 A | | 5/1998 | Riley | |
| 5,942,219 A | | 8/1999 | Hendriks | |
| 5,944,911 A | * | 8/1999 | Winters et al. | 239/532 |
| 6,013,157 A | | 1/2000 | Li et al. | |
| 6,140,285 A | | 10/2000 | Banks et al. | |
| 6,194,473 B1 | | 2/2001 | Lessard et al. | |
| 6,261,463 B1 | | 7/2001 | Jacob et al. | |

(Continued)

FOREIGN PATENT DOCUMENTS

| | | |
|---|---|---|
| WO | 2004/044367 A2 | 5/2004 |
| WO | 2005/115603 A2 | 12/2005 |

OTHER PUBLICATIONS

PCCI Marine and Environmental Engineering, "Oil Spill Containment, Remote Sensing and Tracking for Deepwater Blowouts: Status of Existing and Emerging Technologies" pp. 50-53, Aug. 12, 1999.*

(Continued)

*Primary Examiner* — Frederick L Lagman
(74) *Attorney, Agent, or Firm* — Jayne C. Piana

(57) ABSTRACT

A system for supplying a chemical dispersant to a subsea hydrocarbon discharge site comprises a dispersant source and a dispersant pump configured to pump dispersant from the dispersant source. In addition, the system comprises a first flow line coupled to the pump. Further, the system comprises a subsea dispersant distribution system coupled to the first flow line. Still further, the system comprises a dispersant injection device coupled to the distribution system and configured to inject dispersant from the dispersant source into a subsea hydrocarbon stream.

31 Claims, 14 Drawing Sheets

(56) References Cited

U.S. PATENT DOCUMENTS

| | | | |
|---|---|---|---|
| 6,517,726 B2 | 2/2003 | Allen et al. | |
| 6,660,698 B2 | 12/2003 | Riley | |
| 7,223,362 B2 | 5/2007 | Riley | |
| 7,377,226 B2* | 5/2008 | Choi | 405/60 |
| 8,444,344 B2* | 5/2013 | Oesterberg et al. | 405/60 |
| 2002/0005439 A1* | 1/2002 | Kendall | 239/223 |
| 2010/0300696 A1* | 12/2010 | McCalvin et al. | 166/336 |
| 2012/0085276 A1* | 4/2012 | Openshaw et al. | 114/257 |
| 2012/0087729 A1* | 4/2012 | Oesterberg et al. | 405/60 |
| 2012/0201604 A1* | 8/2012 | Drieu et al. | 405/62 |
| 2012/0251244 A1* | 10/2012 | Toedtman | 405/60 |
| 2012/0305032 A1* | 12/2012 | O'Donnell | 134/34 |
| 2012/0325489 A1* | 12/2012 | Beynet et al. | 166/353 |
| 2013/0022401 A1* | 1/2013 | Magowan | 405/60 |
| 2013/0048295 A1* | 2/2013 | Beynet et al. | 166/341 |

OTHER PUBLICATIONS

"U.S. Approves Use of Subsea Dispersants to Battle Oil Slick," dated May 14, 2010 (http://www.myfoxny.com/story/17422141/us-approves-use-of-subsea-dispersants-to-battle-oil-slick) (2 p.).

CNN: "Feds Tell BP to Cut Use of Oil Dispersants in Gulf," dated May 24, 2010 (http://www.cnn.com/2010/US/05/24/epa.bp.dispersants/index.html) (2 p.).

National Ocean Industries Association (NOIA): "Updated 2—NOIA Member Companies Engaged in Cohesive Deepwater Horizon Response," Press Released dated May 10, 2010 (http://www.noia.org/update-2-noia-member-companies-engaged-in-cohesive-deepwater-horizon-response/) (11 p.).

Tilove, Jonathan, "Subsea Dispersants the Right Call, EPA Administrator Believes," dated Jun. 27, 2010 (http://www.nola.com/news/gulf-oil-spill/index.ssf/2010/06/subsea_dispersants_the_ricght.html) (3 p.).

PCCI Marine and Environmental Engineering: "Oil Spill Containment, Remote Sensing and Tracking for Deepwater Blowouts: Status of Existing and Emerging Technologies," dated Aug. 12, 1999, U.S. Minerals Management Service, pp. 49-54 (6 p.).

Office Action dated May 15, 2013; U.S. Appl. No. 13/294,785 (15 p.).
Response to Office Action Dated May 15, 2013; Response Filed Sep. 16, 2013; U.S. Appl. No. 13/294,785 (12 p.).

* cited by examiner

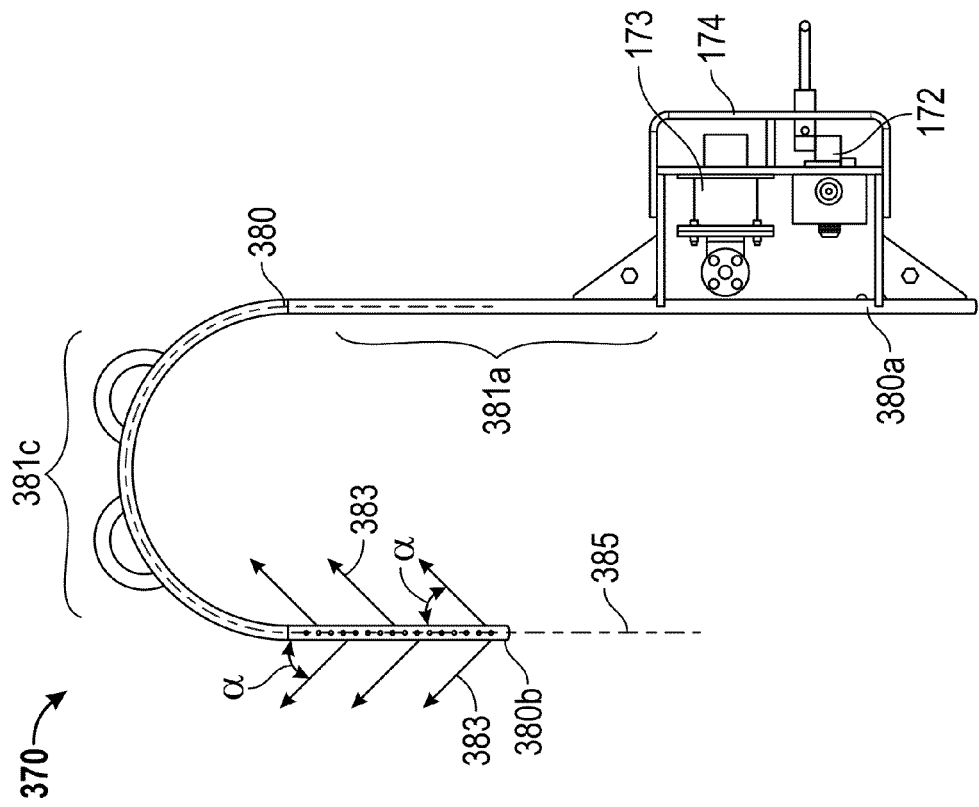
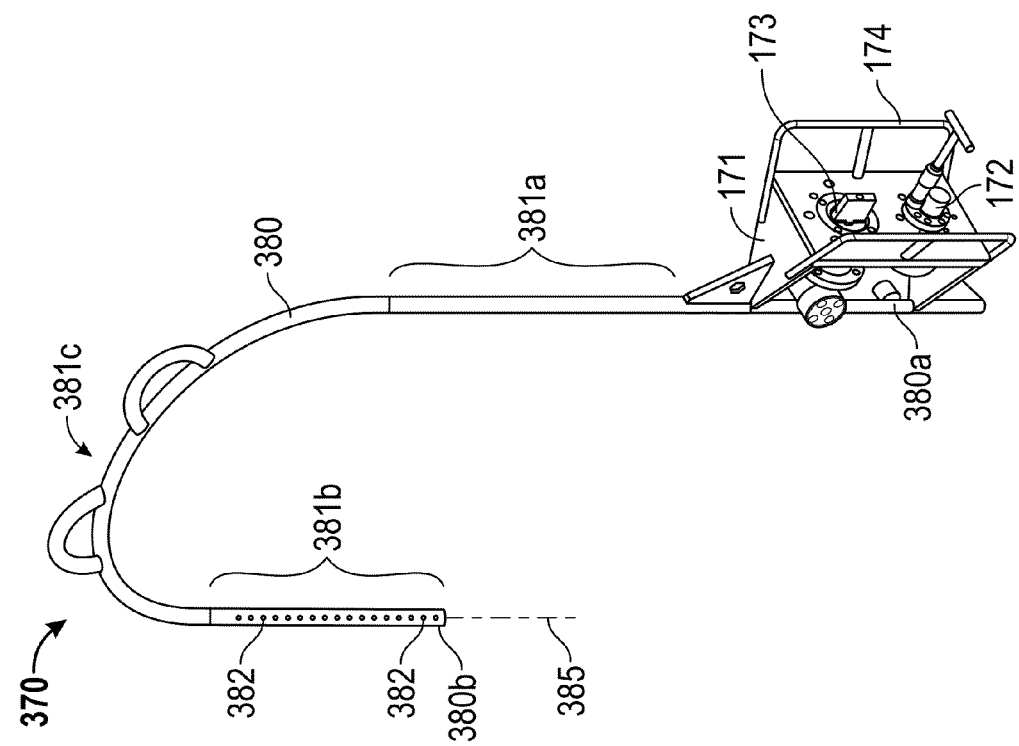

SUBSEA DISPERSANT INJECTION SYSTEMS AND METHODS

CROSS-REFERENCE TO RELATED APPLICATIONS

This application claims benefit of U.S. provisional patent application Ser. No. 61/479,888 filed Apr. 28, 2011, and entitled "Subsea Dispersant Injection Systems and Methods," which is hereby incorporated herein by reference in its entirety.

STATEMENT REGARDING FEDERALLY SPONSORED RESEARCH OR DEVELOPMENT

Not applicable.

BACKGROUND

1. Field of the Invention

The invention relates generally to subsea dispersant systems and methods. More particularly, the invention relates to dispersant systems and methods for managing the subsea release or venting of hydrocarbons.

2. Background of the Technology

In offshore drilling and production operations, hydrocarbons may be discharged or vented into the surrounding sea water. The subsea release of hydrocarbons may present environmental issues. In addition, the subsea release of hydrocarbons may potentially present a hazardous environment at the surface.

Chemical dispersing agents, or simply dispersants, are specially formulated chemical products containing surface-active agents and a solvent. Dispersants aid in breaking up hydrocarbon solids and liquids by reducing the interfacial tension between the oil and water, thereby promoting the migration of finely dispersed water-soluble micelles that are rapidly diluted. As a result, the hydrocarbons are effectively spread throughout a larger volume of water, and the environmental impact may be reduced. In addition, dispersants are believed to facilitate and accelerate the digestion of hydrocarbons by microbes, protozoa, nematodes, and bacteria. Moreover, the use of dispersants reduces the risk to responders at the surface by minimizing the accumulation of oil, associated volatile organic compounds (VOCs) and hydrocarbon vapors. Dispersants can also delay the formation of persistent oil-in-water emulsions.

Traditionally, dispersants have been sprayed onto the oil at the surface of the water. Normally, this process is controlled and delivered from surface vessels or from the air immediately above the oil at the surface. For example, aircraft may be employed to spray oil dispersant over an oil slick on the surface of the sea. For some types of chemical dispersants, the composition of the dispersant itself may present an additional environmental concern. Thus, minimizing the quantity and distribution of dispersants is generally preferred. However, since oil released from a subsea well diffuses and spreads out at it rises to the surface, oil at the surface is often spread out over a relatively large area (e.g., hundreds or thousands of square miles). To sufficiently cover all or substantially all of the oil that reaches the surface, relatively large quantities of dispersant must be distributed over the relatively large area encompassed by the oil slick.

To minimize "overspray" and limit the application of dispersants to the oil slick itself, distribution at the surface typically involves the visualization of the oil slick at the surface. Accordingly, around the clock surface distribution may not be possible (e.g., at night the location and boundaries of the oil slick at the surface may not be visible). However, there is usually a limited time-frame in which dispersants can be successfully applied at the surface. In particular, certain oil constituents evaporate quickly at the surface, leaving waxy residues or "weathered" oil that are often unresponsive to dispersants.

It should also be appreciated that some turbulence at the surface (e.g., wave action) is preferred during surface application of dispersants to sufficiently mix the dispersant into the oil and the treated oil into the water. Depending on the weather and sea conditions, surface turbulence may be less than adequate. Moreover, by limiting distribution of dispersants to the surface, only those microbes at or proximal the surface have an opportunity to begin digestion of the oil.

Accordingly, there remains a need in the art for improved systems and methods for the offshore application of chemical dispersant to discharged hydrocarbons. Such systems and methods would be particularly well received if they offered the potential to minimize the quantity of dispersants emitted, enhance dissipation of the discharged oil before it reaches the surface, operate around the clock (e.g., 24 hours a day), and facilitate increased microbial digestion of oil.

BRIEF SUMMARY OF THE DISCLOSURE

These and other needs in the art are addressed in one embodiment by a system for supplying a chemical dispersant to a subsea hydrocarbon discharge site. In an embodiment, the system comprises a dispersant source and a dispersant pump configured to pump dispersant from the dispersant source. In addition, the system comprises a first flow line coupled to the pump. Further, the system comprises a subsea dispersant distribution system coupled to the first flow line. Still further, the system comprises a dispersant injection device coupled to the distribution system and configured to inject dispersant from the dispersant source into a subsea hydrocarbon stream.

These and other needs in the art are addressed in another embodiment by a method for injecting a chemical dispersant at a subsea hydrocarbon discharge site. In an embodiment, the method comprises (a) storing a chemical dispersant. In addition, the method comprises (b) installing a dispersant distribution system subsea. Further, the method comprises (c) coupling a dispersant injection device to the dispersant distribution system. Still further, the method comprises (d) pumping the dispersant through the distribution system to the injection device.

These and other needs in the art are addressed in another embodiment by a method for injecting a chemical dispersant into a subsea hydrocarbon stream. In an embodiment, the method comprises a (a) flowing a chemical dispersant to a subsea dispersant injection device. In addition, the method comprises (b) positioning the device at least partially in the hydrocarbon stream. Further, the method comprises (c) injecting the dispersant into the hydrocarbon stream.

These and other needs in the art are addressed in another embodiment by a subsea dispersant application device. In an embodiment, the device comprises a base and an elongate dispersant application wand extending from the base. The wand includes a nozzle defining a dispersant outlet configured to inject dispersant into a hydrocarbon stream.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which:

FIG. 7A is a perspective view of an embodiment of a dispersant application device that may be employed with the system of FIG. 1;

FIG. 7B is a side view of the dispersant application device of FIG. 7A;

DETAILED DESCRIPTION OF THE PREFERRED EMBODIMENTS

Figure 1:
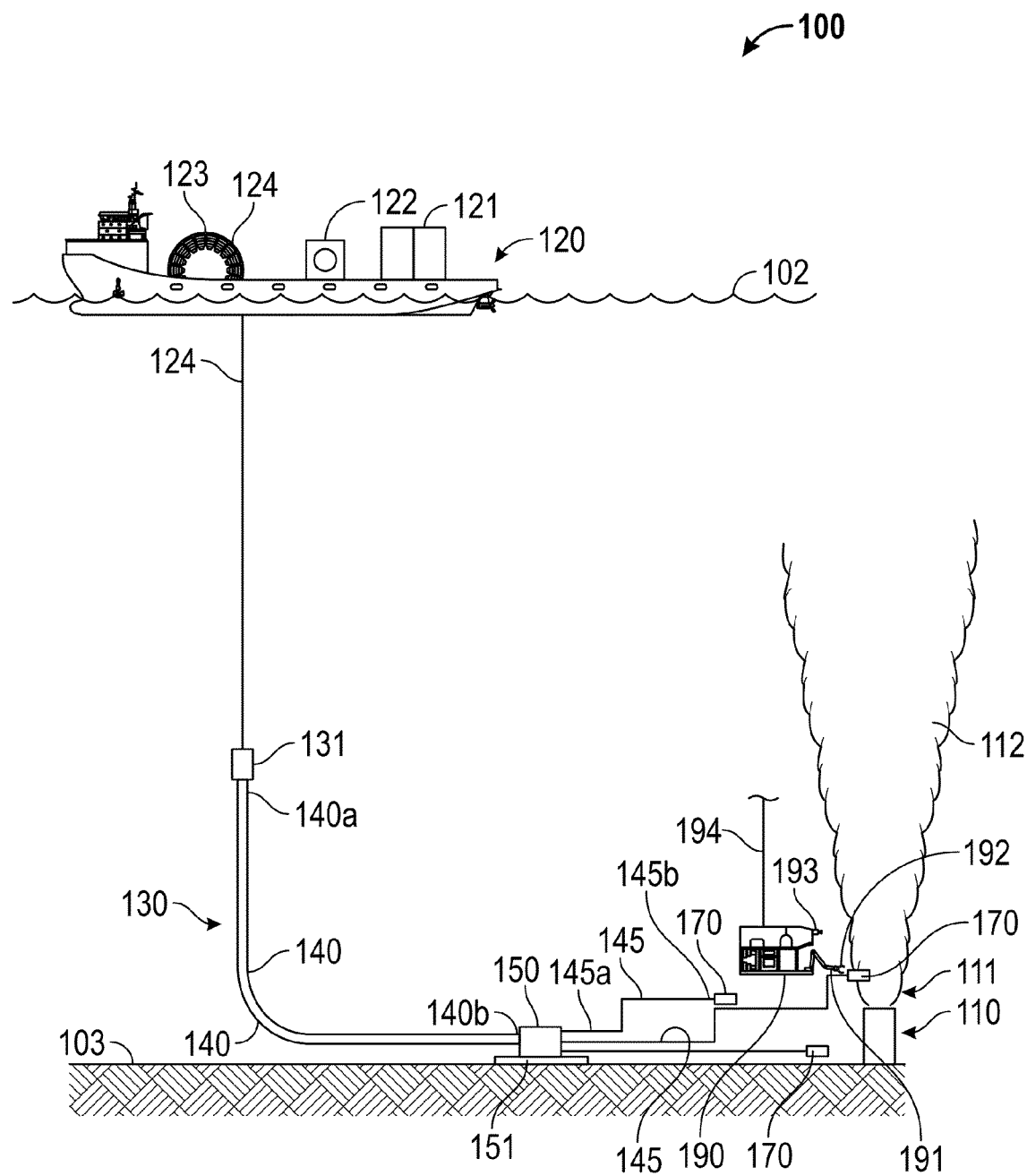
FIG. 1 is a schematic view of an embodiment of a subsea dispersant injection system in accordance with the principles described herein.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIG. 1, an embodiment of a subsea dispersant distribution system 100 in accordance with the principles described herein is schematically shown. System 100 extends from the sea surface 102 to the sea floor 103 and delivers chemical dispersants to one or more subsea hydrocarbon discharge source or site 110. In general, discharge site 110 may be any site at which hydrocarbons are emitted into the surrounding sea water including, without limitation, a subsea BOP, a subsea manifold, a subsea pipe or conduit, a riser, etc. For example, for well pressure control purposes, a well may be intentionally vented into the surrounding sea water from a subsea BOP or manifold upon evacuation of associated surface operations in anticipation of a hurricane. As another example, oil may be emitted into the surrounding sea water from a damaged or broken subsea oil conduit or BOP. At discharge site 110, hydrocarbons are emitted as a stream 111 that slowly diffuses and spreads out as it rises to the sea surface 102 to form a hydrocarbon plume 112. As will be described in more detail below, system 100 is employed to inject a chemical dispersant into the stream 111 of hydrocarbons at discharge site 110 to facilitate its breakup, dissipation, and microbial digestion.

In this embodiment, system 100 includes an offshore support vessel 120 at the sea surface 102, a dispersant distribution system 130 extending along the sea floor 103, and a plurality of subsea dispersant application devices 170 coupled to distribution system 130. In general, support vessel 120 stores chemical dispersants at the sea surface 102 and pumps the chemical dispersants to the distribution system 130. Dispersant in system 130 is then supplied to application devices 170, which are employed by one or more subsea remotely operated vehicles (ROVs) 190 to inject the dispersant into the stream of hydrocarbons emitted at discharge site 110.

Vessel 120 includes a plurality of chemical dispersant storage vessels or tanks 121, a plurality of dispersant injection pumps 122 coupled to tanks 121, and a dispersant flow line 124 extending from pumps 122 to distribution system 130. In this embodiment, flow line 124 is coiled tubing mounted to a coiled tubing reel or unit 123. Tanks 121 store chemical dispersants at the sea surface 102 (i.e., on vessel 120). In this embodiment, three tanks 121 are provided, each tank 121 being the same. Namely, each tank 121 comprises a five-thousand gallon dispersant storage vessel. However, in general, tanks 121 may comprise any suitable number and size dispersant storage tanks. In general, the chemical dispersant stored in tanks 121 and supplied to system 130 may comprise any suitable chemical dispersant including, without limitation, a surfactant or mixture of fluids including surfactants. One example of a suitable chemical dispersant is Corexit® EC9500A available from Nalco Company of Naperville, Ill.

Pumps 122 supply dispersant in tanks 121 to coiled tubing 124 of coiled tubing unit 123. In this embodiment, one fluid pump 122 is provided for each storage tank 121, and thus, each pump 122 pulls dispersant from one tank 121 and supplies it to coiled tubing unit 123 and associated coiled tubing 124. In addition, in this embodiment, each pump 122 includes a flowmeter to measure and monitor the volumetric flow rate of dispersant through that pump 122. Pumps 122 preferably operate at pressures and flow rates suitable for the downstream components of system 100. In this embodiment, each pump 122 is configured to output dispersant at a pressure less than or equal to 5,000 psi and flow rate less than or equal to 12 gpm. However, in other embodiments, the pressure and flow rate of dispersant from pumps 122 may be increased or decreased depending on the limitations of the downstream components. Coiled tubing 124 extends from coiled tubing unit 123 and vessel 120 at the sea surface 102 to subsea distribution system 130. Although this embodiment includes coiled tubing 124 for flowing dispersant from pumps 122 to distribution system 130, in general, any suitable flow line or flexible tubing may be used to supply dispersant from pumps 122 to distribution system 130.

Referring still to FIG. 1, distribution system 130 extends between coiled tubing 124 and application devices 170 and supplies dispersant therebetween. In this embodiment, distribution system 130 includes a coiled tubing distribution panel 131 coupled to tubing 124, a first plurality of flexible dispersant flow lines or hoses 140 coupled to panel 131, a dispersant manifold 150 coupled to hoses 140, and a second plurality of flexible dispersant flow lines or hoses 145 coupled to manifold 150 and application devices 170. Each flow line 140, 145 has a first or inlet end 140a, 145a, respectively, and a second or outlet end 140b, 145b, respectively. In this embodiment, each flow line 140, 145 is a flexible hydraulic hose preferably rated for at least 5,000 psi, and more preferably rated for at least 10,000 psi.

During dispersant injection operations, dispersant is pumped from vessel 120 via pumps 122 down coiled tubing 124 to panel 131, which distributes the dispersant to one or more flexible flow lines 140. Dispersant then flows through lines 140 to manifold 150, which distributes the dispersant to one or more flow lines 145. Each flow line 145 supplies dispersant to one application device 170. Thus, pumps 122 on vessel 120 facilitate the flow of dispersant through system 100 from storage tanks 121 to application devices 170.

One or more subsea ROVs 190 are employed to operate the subsea components of system 100 during dispersant injection operations. In this embodiment, each ROV 190 includes an arm 191 having a claw 192, a subsea camera 193 for viewing the subsea operations, and an umbilical 194. Streaming video and/or images from cameras 193 are communicated to the surface or other remote location via umbilical 194 for viewing on a live or periodic basis. Arms 191 and claws 192 are controlled via commands sent from the surface or other remote location to ROV 190 through umbilical 194. As will be described in more detail below, arms 191 and claws 192 enable ROVs 190 to grasp, manipulate, install, actuate, and position various subsea components.

Figure 2A:
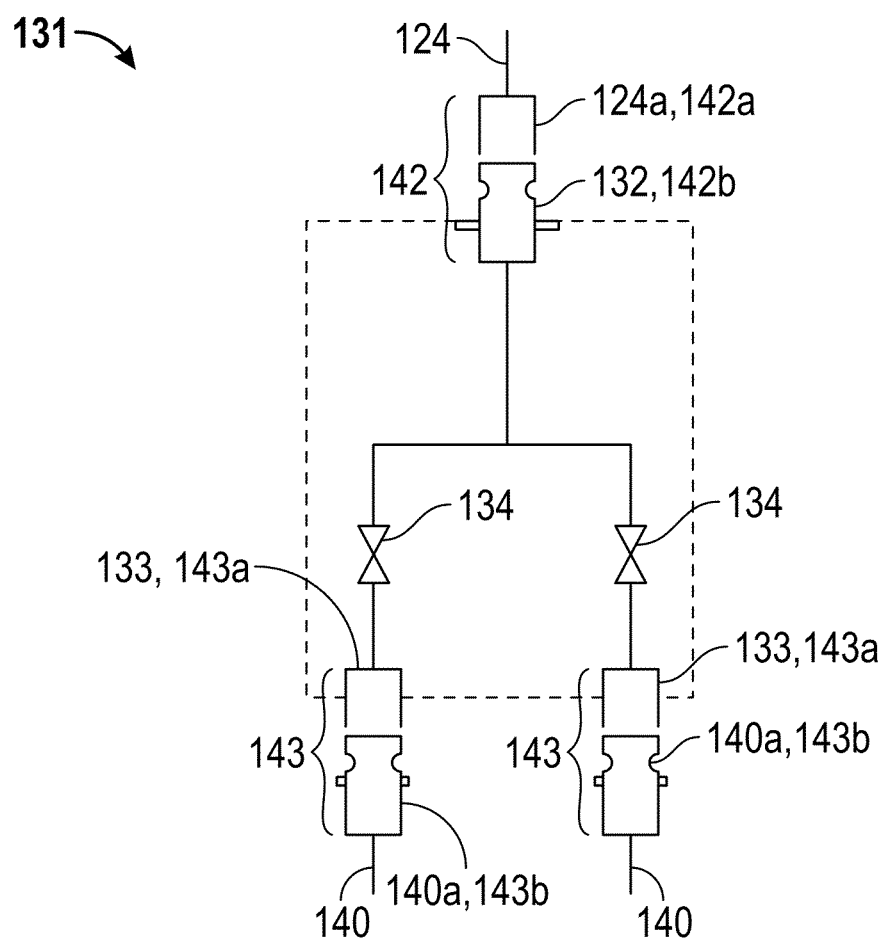
FIG. 2A is an enlarged schematic view of the dispersant distribution panel of FIG. 1.

Referring now to FIGS. 1 and 2A, distribution panel 131 is hung and suspended subsea from a lower end 124a of coiled tubing 124. To reduce and/or minimize stresses on coiled tubing 124, panel 131 is preferably weighted such that when coiled tubing 124 is coupled thereto, tubing 124 is placed in tension and in a substantially vertical orientation. In this embodiment, distribution panel 131 comprises a dispersant inlet 132 and a pair of dispersant outlets 133. Inlet 132 is in fluid communication with tubing 124. In particular, lower end 124a of coiled tubing 124 is releasably connected to inlet 132 with a coupling 142. In addition, each outlet 133 is in fluid communication with manifold 150 via one hose 140. In particular, inlet end 140a of each hose 140 is releasably connected to one outlet 133 with a coupling 143. In general, each coupling 142, 143 may comprise any suitable type of releasable coupling including, without limitation, J-lock connections or 17H hot stab connections. In this embodiment, coupling 142 is a 17H hot stab connection including a female hot stab coupling member 142a and a male hot stab coupling member 142b configured to mate and releasably engage female coupling member 142a; and each coupling 143 is a J-lock connection including a female coupling members 143a and a male coupling member 143b configured to mate and releasably engage a corresponding female coupling member 143a.

As best shown in FIG. 2A, each outlet 133 includes an outlet valve 134 that controls the flow of dispersant through that outlet 133. Accordingly, inlet 132 is in fluid communication with each outlet 133 that has its corresponding outlet valve 134 opened. Thus, if both outlet valves 134 are opened, inlet 132 is in fluid communication with both outlets 133; if one outlet valve 134 is opened and the other outlet valve 134 is closed, inlet 132 is in fluid communication with outlet 133 associated with the opened valve 134 and is not in fluid communication with outlet 133 associated with the closed valve 134; and if both outlet valves 134 are closed, inlet 132 is not in fluid communication with either outlet 133. In this embodiment, each outlet valve 134 is a quarter-turn ball valve that is manually actuated by one or more subsea ROVs 190. However, in general, each valve 134 may comprise any suitable valve capable of being transitioned between an open position allowing fluid flow therethrough and a closed position preventing fluid flow therethrough. Examples of suitable valves include, without limitation, gate valves, ball valves, and butterfly valves. In addition, although valves 134 are manual valves operated by subsea ROVs 190 in this embodiment, in other embodiments, valves 134 may be actuated by other suitable means including, without limitation, hydraulic actuation, electric actuation, pneumatic actuation, or combinations thereof. To minimize and/or eliminate the inadvertent emission of chemical dispersants into the surrounding sea water prior to venting or discharge of hydrocarbons subsea, outlet valves 134 are preferably closed until it is time to inject the dispersant into the subsea hydrocarbon stream.

Figure 2B:
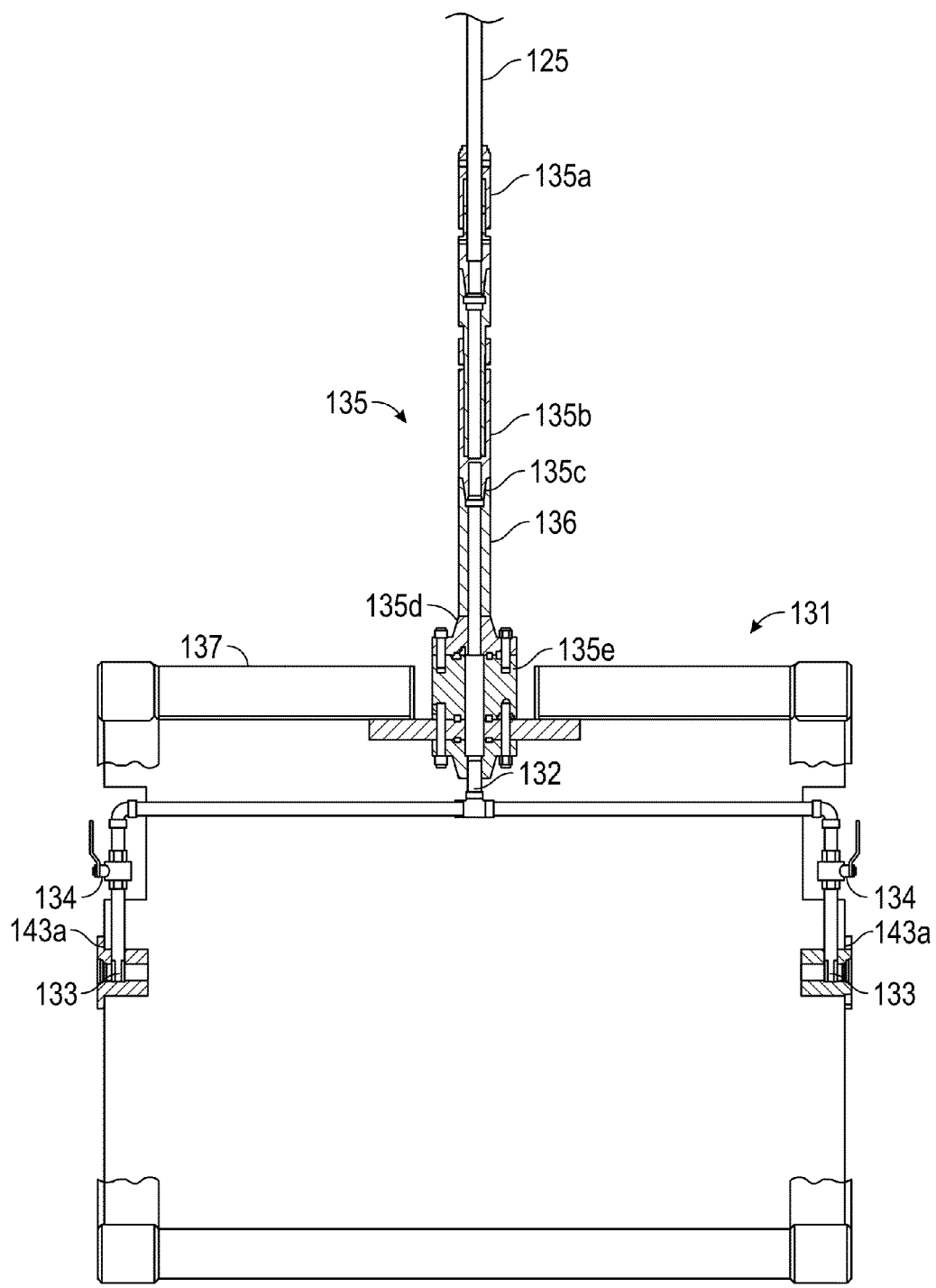
FIG. 2B is an enlarged partial cross-sectional view of the dispersant distribution panel and the coiled tubing of FIG. 1 coupled together with a connection assembly.

As shown in FIG. 2A, coiled tubing 124 is releasably connected to distribution panel 131 with coupling 142. Alternatively, the coiled tubing (e.g., tubing 124) may connected to the hung distribution panel (e.g., panel 131) with a connection assembly. For example, referring now to FIG. 2B, coiled tubing 124 and distribution panel 131, each as previously described, are coupled together with a connection assembly 135. In this embodiment, connection assembly 135 includes a coiled tubing connector 135a, a locking swivel joint 135b, a PAC connection 135c, a cross-over flange 135d, and a double stud flange 135e. Connector 135a, which accepts coiled tubing 124, connects to locking swivel joint 135*b*, which connects to PAC connection 135*c*. A tubular 136 may be employed to lengthen the connection between PAC connection 135*c* and the cross over flange 135*d*. Alternatively, PAC connection 135*c* may be directly connected to cross over flange 135*d*. Double stud flange 135*e* connects to the lower end of cross over flange 135*d* and is centrally positioned within an opening in the upper end of the housing 137 of distribution panel 131. Dispersant inlet 131 is connected to the lower end of the double stud flange 135*e*.

Figure 3:
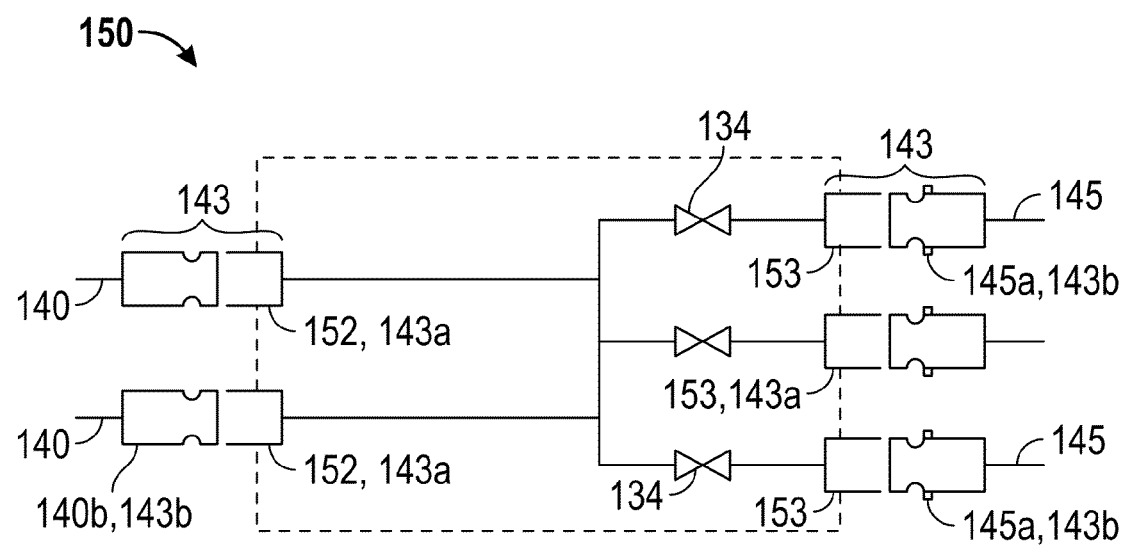
FIG. 3 is an enlarged schematic view of the dispersant manifold of FIG. 1.

Referring now to FIGS. 1 and 3, distribution manifold 150 is positioned at the sea floor 103 on a mud mat 151. Mud mat 151 distributes the weight of manifold 150 along the sea floor 103, thereby restricting and/or preventing manifold 150 from sinking into the sea floor 103. In addition, mud mat 151 covers and shields the sea floor 103 from turbulence induced by ROV thrusters, thereby reducing visibility loss due to disturbed mud during installation and operation.

In this embodiment, manifold 150 comprises a pair of dispersant inlets 152 and a plurality of dispersant outlets 153. Each inlet 152 is in fluid communication with one flow line 140. In particular, each inlet 152 is releasably connected to outlet end 140*b* of one flow line 140 with a coupling 143 as previously described. In addition, each outlet 153 is in fluid communication with one application device 170 via one hose 145. In particular, inlet end 145*a* of each hose 145 is releasably connected to one outlet 153 with a coupling 143 as previously described. Inclusion of multiple inlets 152 and multiple outlets 153 provides redundancy in the case of a damaged flow line 140, 145. Although this embodiment of manifold 150 includes two inlets 152 and three outlets 153, in general, the manifold (e.g., manifold 150) may include any suitable number of inlets (e.g., inlets 152) and outlets (e.g., outlets 153).

As best shown in FIG. 3, each outlet 153 includes an outlet valve 134 as previously described that controls the flow of dispersant through that outlet 153. Accordingly, each inlet 152 is in fluid communication with each outlet 153 that has its corresponding outlet valve 134 opened. As previously described, in this embodiment, each outlet valve 134 is a quarter-turn ball valve that is manually actuated by one or more subsea ROVs 190. However, in general, each valve 134 may comprise any suitable valve capable of being transitioned between an open position allowing fluid flow therethrough and a closed position preventing fluid flow therethrough. Examples of suitable valves include, without limitation, gate valves, ball valves, and butterfly valves. In addition, although valves 134 of manifold 150 are manual valves operated by subsea ROVs 190 in this embodiment, in other embodiments, valves 134 of manifold 150 may be actuated by other suitable means including, without limitation, hydraulic actuation, electrical actuation, pneumatic actuation, or combinations thereof. To minimize and/or eliminate the inadvertent emission of chemical dispersants into the surrounding sea water prior to venting or discharge of hydrocarbons subsea, outlet valves 134 of manifold 150 are preferably closed until it is time to inject the dispersant into the subsea hydrocarbon stream.

Referring again to FIGS. 1 and 3, each distribution manifold outlet 153 supplies dispersant to one dispersant application device 170 via one flow line 145. As previously described, inlet end 145*a* of each flow line 145 is releasably connected to one outlet 153 with a coupling 143. Likewise, outlet end 145*b* of each flow line 145 is releasably connected to one dispersant application device 170 with a coupling 143. In general, each device 170 may comprise any device that allows dispersant to be injected into the hydrocarbon stream at discharge site 110. Exemplary embodiments of dispersant application devices (e.g., devices 170) are described in more detail below. In general, devices 170 are operated, manipulated, and maneuvered by subsea ROVs 190.

Referring still to FIG. 1, manifold 150, flow lines 140, 145, and devices 170 are delivered subsea, coupled together subsea, and operated subsea with one or more subsea ROVs 190. In general, one or more of these components may be implemented as a preventative measure in case a subsea hydrocarbon discharge occurs (i.e., before any hydrocarbons are discharged subsea), or implemented on an as-needed basis (i.e., after a subsea hydrocarbon discharge has been identified). Following installation of manifold 150, flow lines 140, 145 and devices 170, panel 131 may be lowered subsea from vessel 120 hung from coiled tubing 124. Next, outlets 133 of panel 131 are coupled to lines 140 with subsea ROVs 190, and one or more devices 170 are delivered subsea and coupled to lines 145 with subsea ROVs 190.

After installation, but prior to use of system 100, the various valves of system 100 (e.g., valves 134) are preferably closed to minimize the risk of an inadvertent leak or discharge of dispersant into the surrounding sea water. For example, outlet valves 134 of panel 131 are preferably closed. Select downstream valves may be left open prior to use of system 100 to minimize the time and effort required for ROVs 190 to open the numerous valves necessary for the operation of system 100 once it is needed. For example, outlet valves 134 of manifold 150 may be opened positions prior to actual use of system 100.

System 100 may be transitioned from the "stand-by" mode to an "operating" or "activated" mode, in which dispersant is supplied from storage tanks 121 to application devices 170, upon the subsea discharge and/or venting of hydrocarbons at one or more discharge sites 110. In particular, system 100 is activated by operating pumps 122 and open valves 134, thereby allowing dispersant to flow from tanks 121 to devices 170. Once system 100 has been activated, ROVs 190 operate and position one or more devices 170 to continuously flow dispersant to site 110. Thus, in general, system 100 can deliver dispersant to site 110 around the clock as long as tanks 121 include dispersant.

During operation of system 100, dispersant is pumped from storage vessels 121 to panel 131 with coiled tubing 124, and then supplied from panel 131 to manifold 150 with flow lines 140. From distribution manifold 150, the dispersant flows through lines 145 to devices 170. Accordingly, system 100 may also be described as including one or more dispersant storage vessels or tanks that store dispersant at the surface (e.g., tanks 121), a subsea hydrocarbon discharge site that emits a hydrocarbon stream subsea (e.g., site 110), and a dispersant delivery system that delivers the dispersant from the storage tanks to the discharge site (e.g., coiled tubing 124, panel 131, flow lines 140, 145, manifold 150, and devices 170). Although delivery system 130 includes a plurality of interconnected dispersant supply lines (e.g., flow lines 140, 145) and manifold (e.g., panel 131 and manifold 150), in other embodiments, other suitable connections and components may be provided to deliver the dispersant from the storage assemblies to the discharge sites. For example, distribution manifold 150 could be eliminated and panel 131 directly connected to devices 170. Moreover, although system 100 has been shown and described as having dispersant storage tanks 121 located aboard support vessel 120 at sea surface 102, in other embodiments, the dispersant storage tanks (e.g., tanks 121) may be located on other surface structures (e.g., platform or rig), disposed beneath the sea surface above the sea floor, or disposed on the sea floor.

Figure 4A:
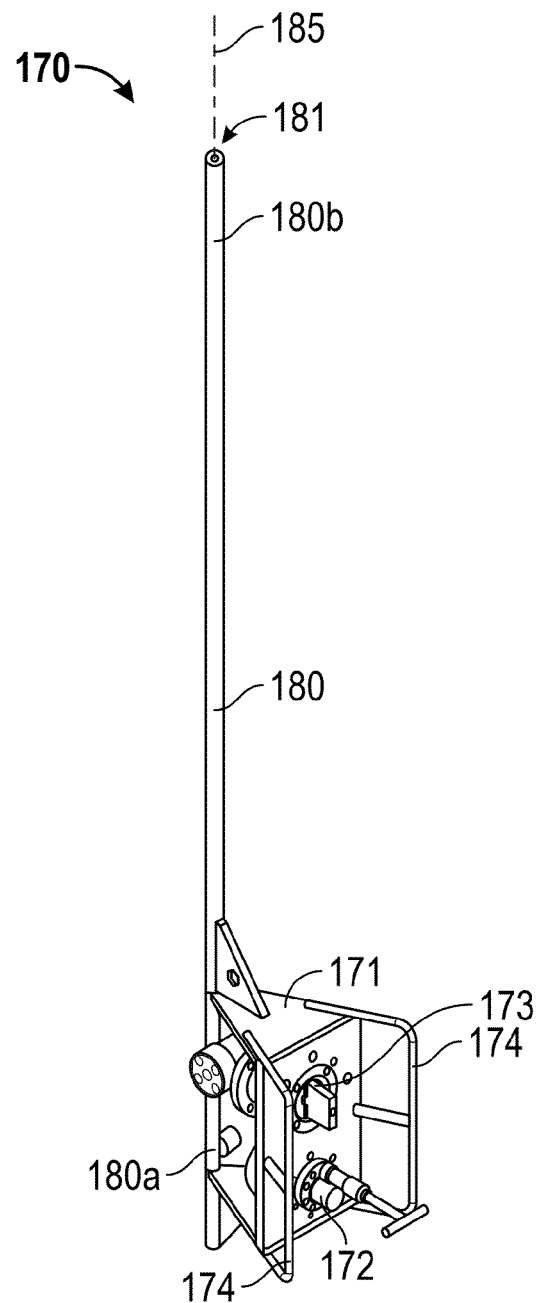
FIG. 4A is a perspective view of one of the dispersant application devices of FIG. 1.
Figure 4B:
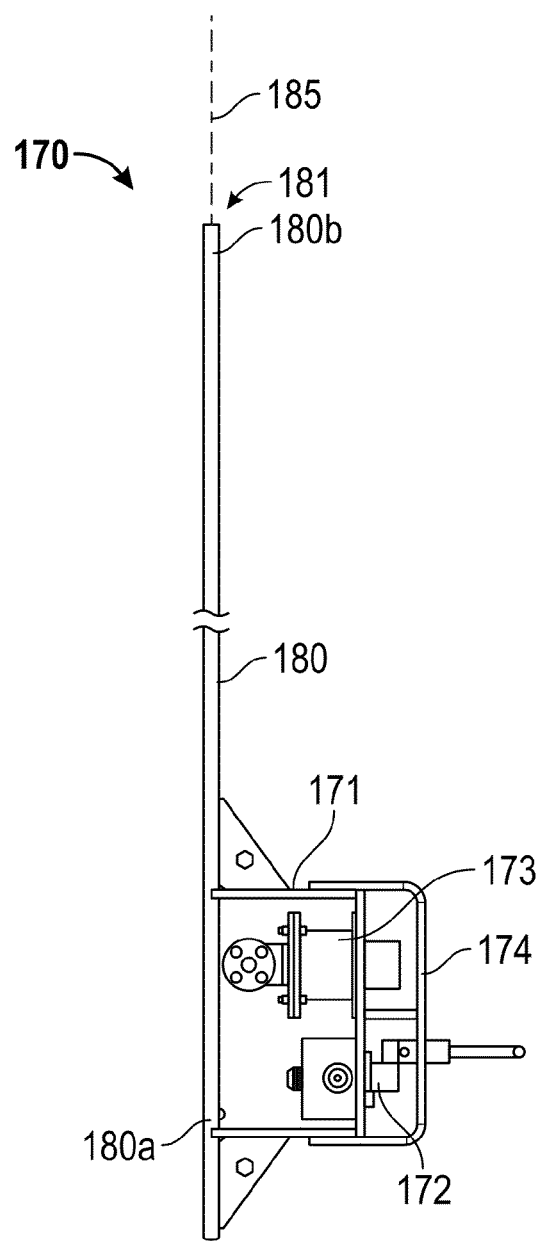
FIG. 4B is a side view of the wand of FIG. 4A.

Referring now to FIGS. 4A and 4B, an embodiment of a dispersant application device 170 for injecting dispersants into a subsea stream of hydrocarbons is shown. Device 170 is connected to outlet end 145b of one dispersant flow line 145 previously described and shown in FIG. 1 to inject dispersant into subsea hydrocarbon discharge site 110. In this embodiment, dispersant application device 170 comprises a base 171 and an elongate dispersant application wand 180 extending from base 171. Wand 180 is a tubular having a central or longitudinal axis 185, a first or base end 180a coupled to base 171, and a second or free end 180b opposite end 180a and distal base 171. In this embodiment, wand 180 and axis 185 extend linearly from base 171. Distal end 180b of wand 180 comprises an orifice defining a nozzle 181 for injecting dispersant into the hydrocarbon stream at discharge site 110. In general, dispersant from distribution system 130 flows through flow line 145 to base 171, and is then supplied through wand 180 to nozzle 181.

Device 170 also includes a dispersant inlet 172 and an inlet valve 173, each mounted to base 171. Inlet 172 is in fluid communication with one flow line 145 previously described. In particular, inlet 172 is releasably connected to outlet end 145b of one flow line 145 with a coupling 143 as previously described. Inlet valve 173 controls the flow of dispersant through inlet 172 and wand 180. Specifically, when inlet valve 173 is opened, inlet 172 and hose 145 are in fluid communication with wand 180. However, when valve 173 is closed, fluid communication between inlet 172 and wand 180 is restricted and/or prevented. In this embodiment, inlet valve 173 is a quarter-turn ball valve that is manually actuated by one or more subsea ROVs 190. However, in general, valve 173 may comprise any suitable valve capable of being transitioned between an open position allowing fluid flow therethrough and a closed position preventing fluid flow therethrough. Examples of suitable valves include, without limitation, gate valves, ball valves, and butterfly valves. In addition, although valve 173 is a manual valve operated by subsea ROVs 190 in this embodiment, in other embodiments, valve 173 may be actuated by other suitable means including, without limitation, hydraulic actuation, electrical actuation, pneumatic actuation, or combinations thereof. To minimize and/or eliminate the inadvertent emission of chemical dispersants into the surrounding sea water prior to venting or discharge of hydrocarbons subsea, valve 173 is preferably closed until it is time to inject the dispersant into the subsea hydrocarbon stream. A pair of handles 174 extend from base 171 and enable one or more ROVs 190 to grasp, manipulate, and position device 170.

Figure 5:
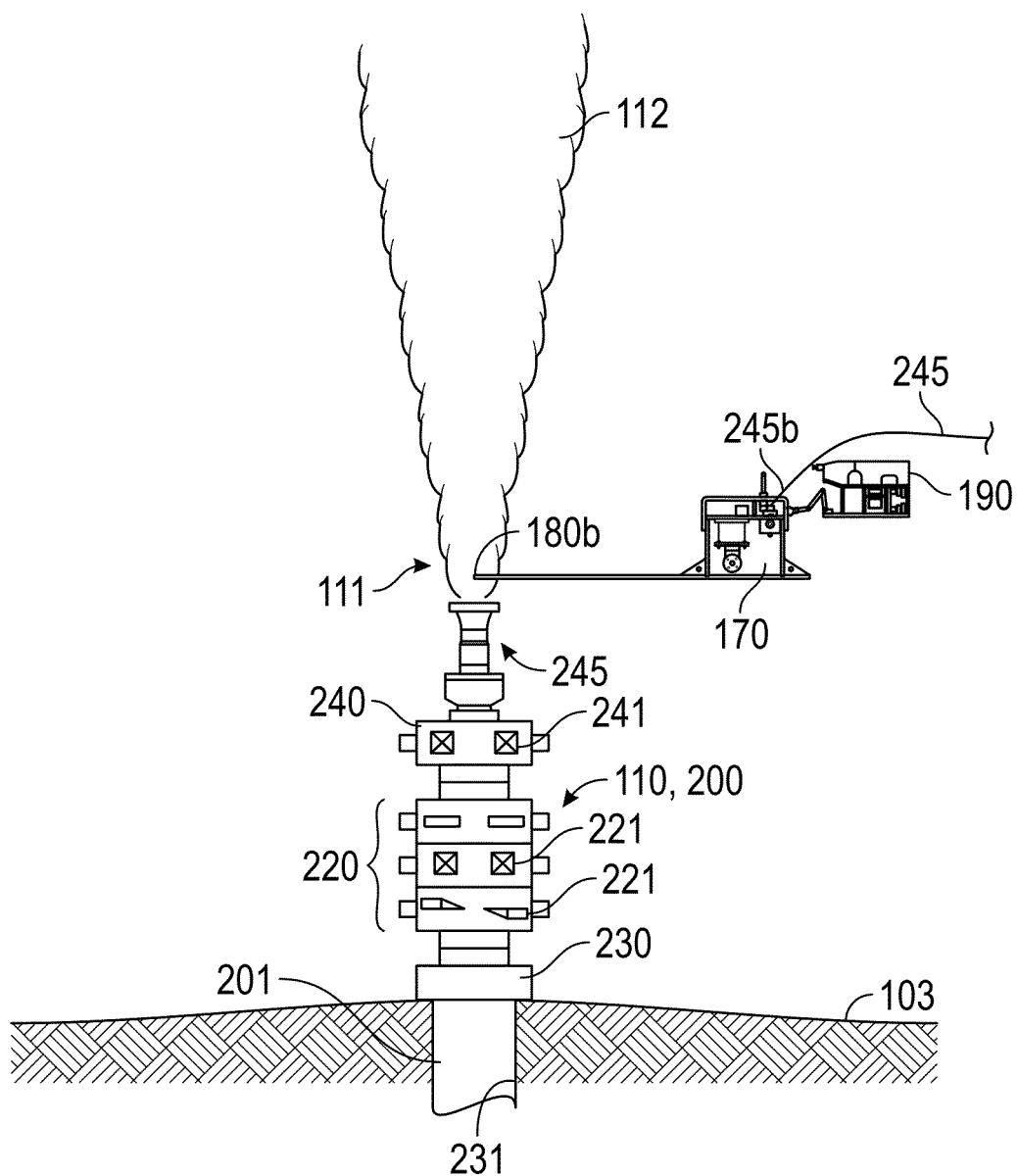
FIG. 5 is a schematic view of the dispersant application device of FIGS. 4A and 4B deployed with a subsea remotely operated vehicle to inject dispersant into a subsea hydrocarbon stream at a subsea hydrocarbon discharge site.

Referring now to FIG. 5, device 170 is shown injecting dispersant into a subsea hydrocarbon stream 111 at a subsea hydrocarbon discharge site 110. In this embodiment, discharge site 110 is a subsea BOP stack 200 including a subsea blowout preventer (BOP) 220 mounted to a wellhead 230 at the sea floor 103, and a lower marine riser package (LMRP) 240 including a riser flex joint 245. Casing 231 extends from wellhead 230 into subterranean wellbore 201. Typically, a riser extends from LMRP 240 to a platform or vessel at the sea surface 102, however, in this embodiment, the riser has been removed to provide direct access to BOP stack 200.

BOP 220 and LMRP 240 are configured to selectively seal wellbore 201 and contain hydrocarbon fluids therein with one or more sets of opposed rams 221 in BOP 220 (e.g., opposed blind shear rams or blades, opposed pipe rams, etc.) and/or an annular blowout preventer 241 in LMRP 240 (i.e., an annular elastomeric sealing element that is mechanically squeezed radially inward). During a "kick" or surge of formation fluid pressure in wellbore 201, one or more sets of rams 221 and/or annular BOP 241 are normally actuated to seal in wellbore 201. In the event the wellbore is not sealed, there is the potential for an unintended discharge of hydrocarbon fluids, which could be subsea. In FIG. 5, stack 200 is shown after a subsea blowout. As a result, hydrocarbon fluids flowing upward in wellbore 201 pass through BOP 220 and LMRP 240, and are discharged into the surrounding sea water proximal the sea floor 103, thereby resulting in hydrocarbon stream 111 and plume 112.

Referring now to FIGS. 1 and 5, to inject chemical dispersants into stream 111, device 170 is connected to outlet end 145b of one flow line 145 with ROV 190, and then positioned and oriented with ROV 190 such that free end 180b is disposed in hydrocarbon stream 111 at discharge site 110. Using system 100, dispersant is pumped from tanks 121 to application device 170. With valve 173 opened, the dispersant flows through inlet 172 and wand 180 to end 180b where it is injected into stream 111 through nozzle 181.

Figure 6A:
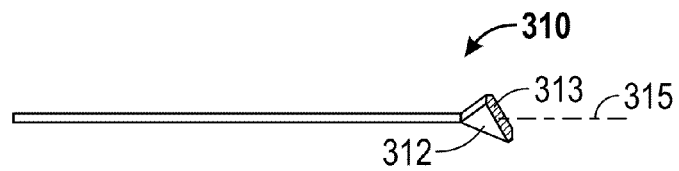
FIGS. 6A-6E are side views of embodiments of dispersant injection wands that may be employed with the base of FIGS. 4A and 4B.
Figure 6B:
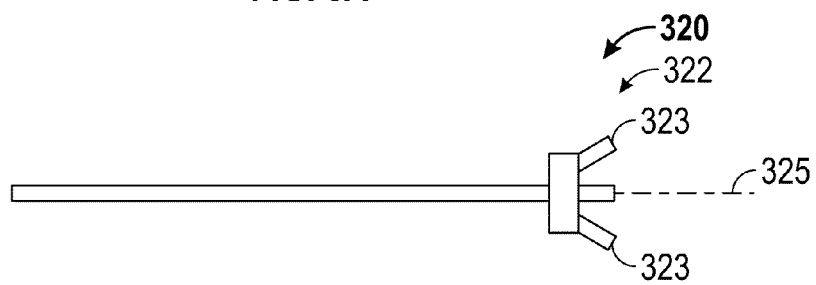
Figure 6C:
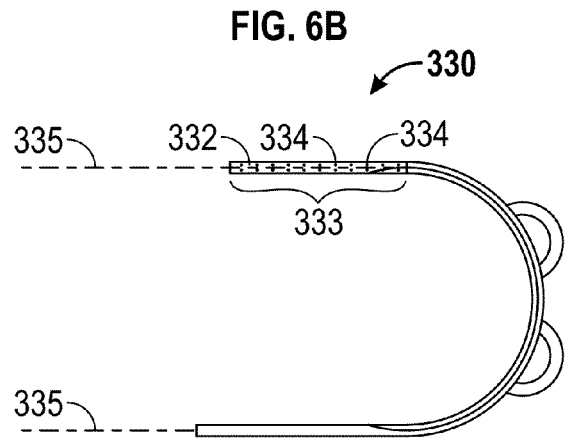
Figure 6D:
Figure 6E:
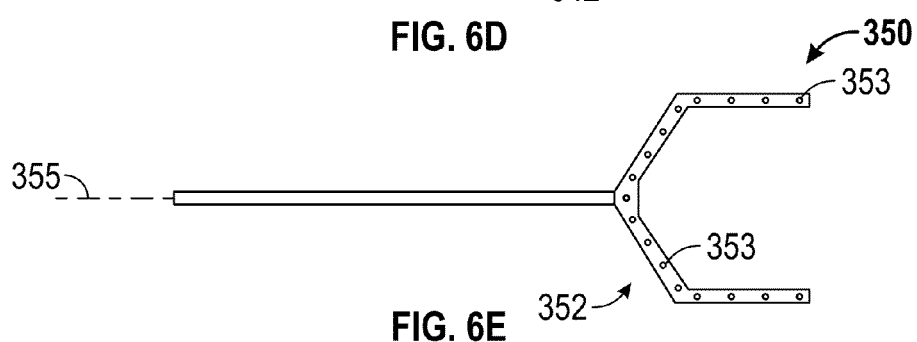

As shown in FIGS. 4A and 4B, wand 180 has a linear central axis 185, and distal end 180b includes a single nozzle 181. However, in general, the wand (e.g., wand 180) may have any suitable geometry and the distal end or portion (e.g., end 181b) may include any suitable number of nozzles. In FIGS. 6A-6E, a variety of exemplary wands that may be used in connection with application device 170 in place of wand 180 previously described are shown. In FIG. 6A, a wand 310 having a linear central axis 315 and a free end 312 having a fan geometry including a plurality of dispersant injection nozzles 313 is shown. In FIG. 6B, a wand 320 having a linear central axis 325 and a free end 322 having a trident geometry including three dispersant injection nozzles 323 is shown. In FIG. 6C, a hook-shaped wand 330 having an arcuate central axis 335, a free end 332, and a distal portion 333 including a plurality of axially and circumferentially spaced dispersant injection nozzles 334 is shown. In FIG. 6D, a wand 340 having a linear central axis 345 and a C-shaped distal portion 342 including a plurality of dispersant injection nozzles 343 is shown. In FIG. 6E, a wand 350 having a linear central axis 355 and a Y-shaped distal portion 352 including a plurality of dispersant injection nozzles 353 is shown. Embodiments of dispersant application devices (e.g., device 170) including wands 310, 320, 330, 340, 350 may be deployed in the same manner device 170 previously described and shown in FIG. 5.

Regardless of the geometry of the wand of the dispersant application device (e.g., straight wand 180, hook-shaped wand 330, C-shaped wand 340, Y-shaped wand 350, etc.), the dispersant nozzles are preferably positioned and oriented to generate a vortex to enhance mixing of the dispersant and the discharged hydrocarbons. In addition, the nozzles are preferably configured to enhance the contact surface area between the discharged dispersant and the hydrocarbons. For example, the nozzles may be configured to discharge relatively small droplets of dispersant.

Referring now to FIGS. 7A and 7B, another embodiment of a dispersant application device 370 is shown. Device 370 may be used in system 100 previously described in the place of any one or more of devices 170. Accordingly, device 370 is connected to outlet end 145b of one dispersant flow line 145 to inject dispersant into subsea hydrocarbon discharge site 110. Device 370 is similar to device 170 previously described. Namely, device 370 comprises base 171 as previously described and an elongate dispersant application wand 380 extending from base 171. Wand 380 is a tubular having a central or longitudinal axis 385, a first or base end 380a coupled to base 171, and a second or free end 380b opposite end 380a and distal base 171. However, in this embodiment, wand 380 is hook-shaped and axis 385 is arcuate. In particular, wand 380 may be divided into three axial sections—a first or proximal section 381a extending linearly from base 171, a second or distal section 381b extending linearly from distal end 380b, and a third or intermediate section 381c extending between sections 381a, b. Section 381c is semi-circular (i.e., curved through 180°), and thus, section 381b is oriented parallel to section 381a. Distal section 381b of wand 380 includes a plurality of axially and circumferentially spaced orifices defining nozzles 382. In this embodiment, nozzles 382 are oriented so that the resultant reaction force from the discharged dispersant through nozzles 382 urge distal section 381b into the discharge site counter to the flow of the hydrocarbon stream. Nozzles 382 are thus oriented such that the dispersant is discharged generally upward away from end 380b and toward section 381c in a direction 383. In particular, a majority of nozzles 382 are oriented at an acute angle α measured downward from axis 385 within section 381b. Angle α is preferably less than 90° and more preferably about 60°.

Figure 8:
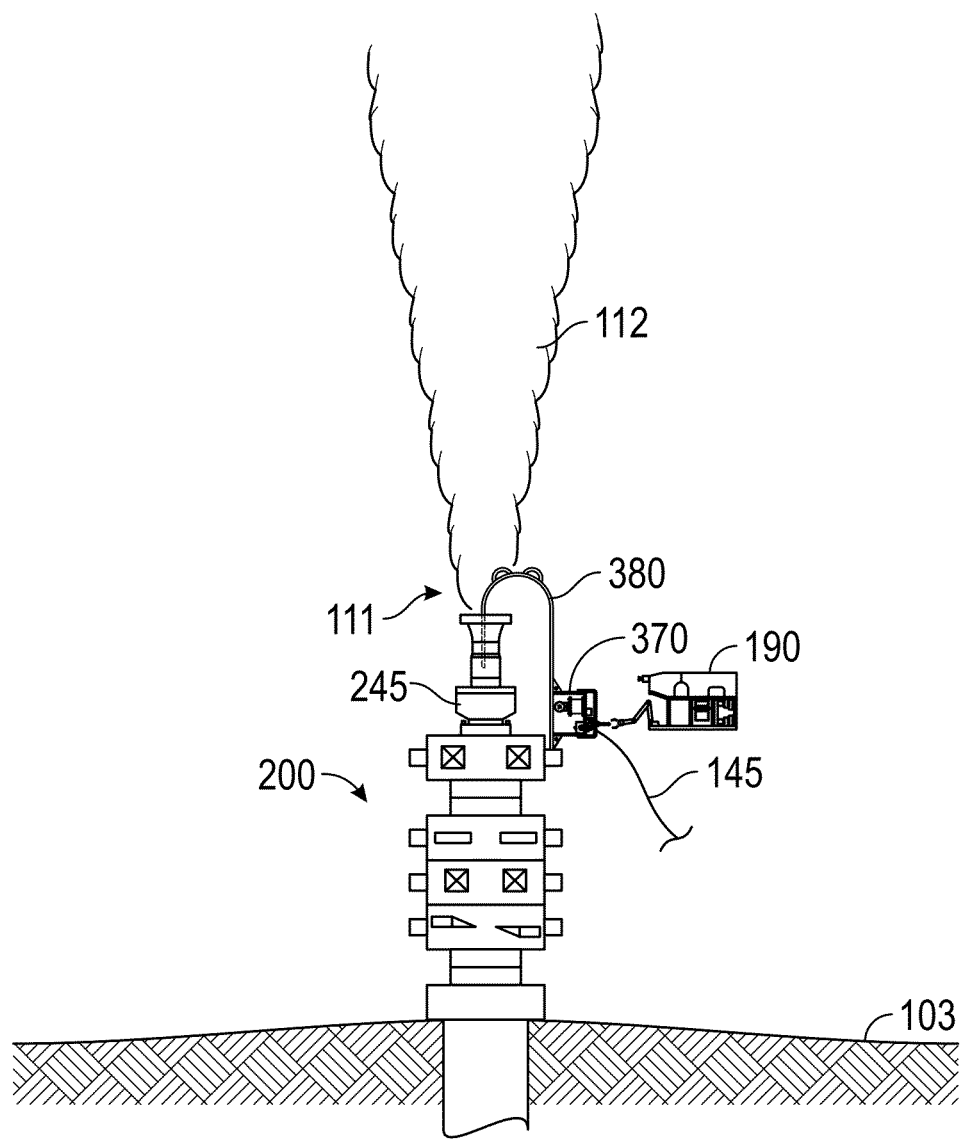
FIG. 8 is a schematic view of the dispersant application device of FIGS. 7A and 7B deployed with a subsea remotely operated vehicle to inject dispersant into a subsea hydrocarbon stream at a subsea hydrocarbon discharge site.

Referring now to FIG. 8, device 370 is shown injecting dispersant into a subsea hydrocarbon stream 111 emitted from BOP stack 200 previously described. Device 370 is connected to outlet end 145b of one flow line 145 with ROV 190, and then positioned with ROV 190 such that distal section 381b is disposed within flex joint 245 at the upper end of BOP stack 200. Base 171 and proximal section 381a of wand 380 are positioned outside flex joint 245. Device 370 may be held in position with ROV 190 or hung from joint 245 under its own weight. It should appreciate that the stream 111 of hydrocarbons emitted from flex joint 245 exerts forces on wand 380 tending to push it axially upward and out of flex joint 245. However, as previously described, in this embodiment, nozzles 382 are oriented to discharge dispersant in a generally upward direction 383, which urges section 381b downward within flex joint 245 and counteracts forces exerted on wand 380 by stream 111, thereby maintaining section 381b within flex joint 245 without the aid of ROV 190.

Added weight may be added to base 371 to help maintain distal section 381b within flex joint 245 and/or device 370 may be mechanically coupled to BOP stack 200. However, if added weight or a coupling between device 370 and BOP stack 200 is employed to maintain the position of distal section 381b within flex joint 245, the orientation of nozzles 382 may be varied to enhance mixing of the injected dispersant and hydrocarbons. For example, nozzles 382 may be oriented generally downward to facilitate the counterflow of hydrocarbons and dispersant.

In FIGS. 5 and 8, embodiments of dispersant application devices (e.g., devices 170, 370) are shown injecting dispersant supplied by system 100 into hydrocarbon stream 111 emitted from BOP stack 200. In those embodiments, stream 111 is emitted directly into the surrounding sea water from the upper end of BOP stack 200. However, other components and/or devices may be used to capture at least some of the hydrocarbons discharged from site 110. Embodiments of dispersant application devices may also be used in conjunction with such hydrocarbon capture devices.

Figure 9:
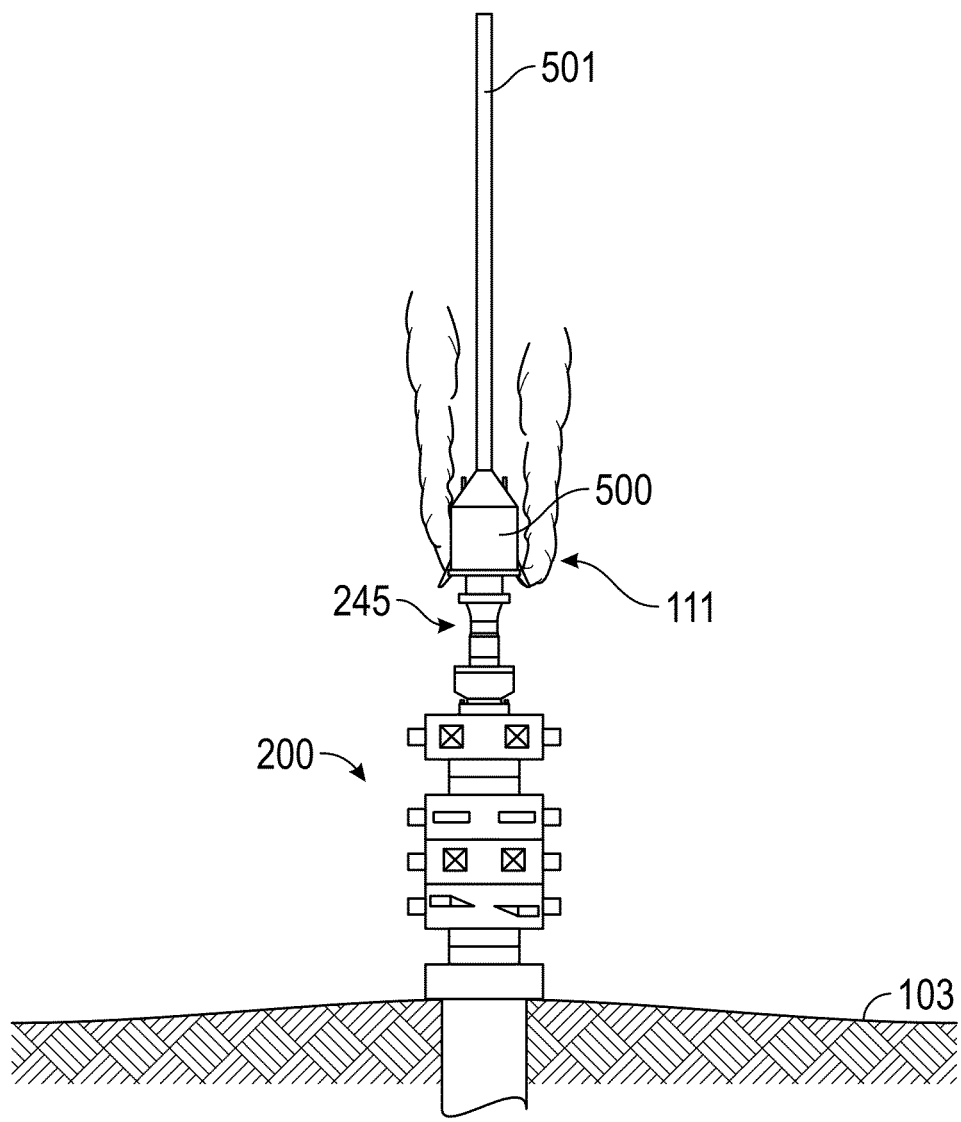
FIG. 9 is a schematic view of a hydrocarbon capture apparatus positioned above a subsea hydrocarbon discharge site to receive at least a portion of the discharged hydrocarbons.

Referring now to FIG. 9, an embodiment of a hydrocarbon capture apparatus or top hat 500 for receiving at least a portion of the hydrocarbons emitted from BOP stack 200 previously described is shown. Top hat 500 is lowered subsea with a tubular pipe string 501 and positioned immediately above flex joint 245 to receive emitted hydrocarbon stream 111.

Figure 10:
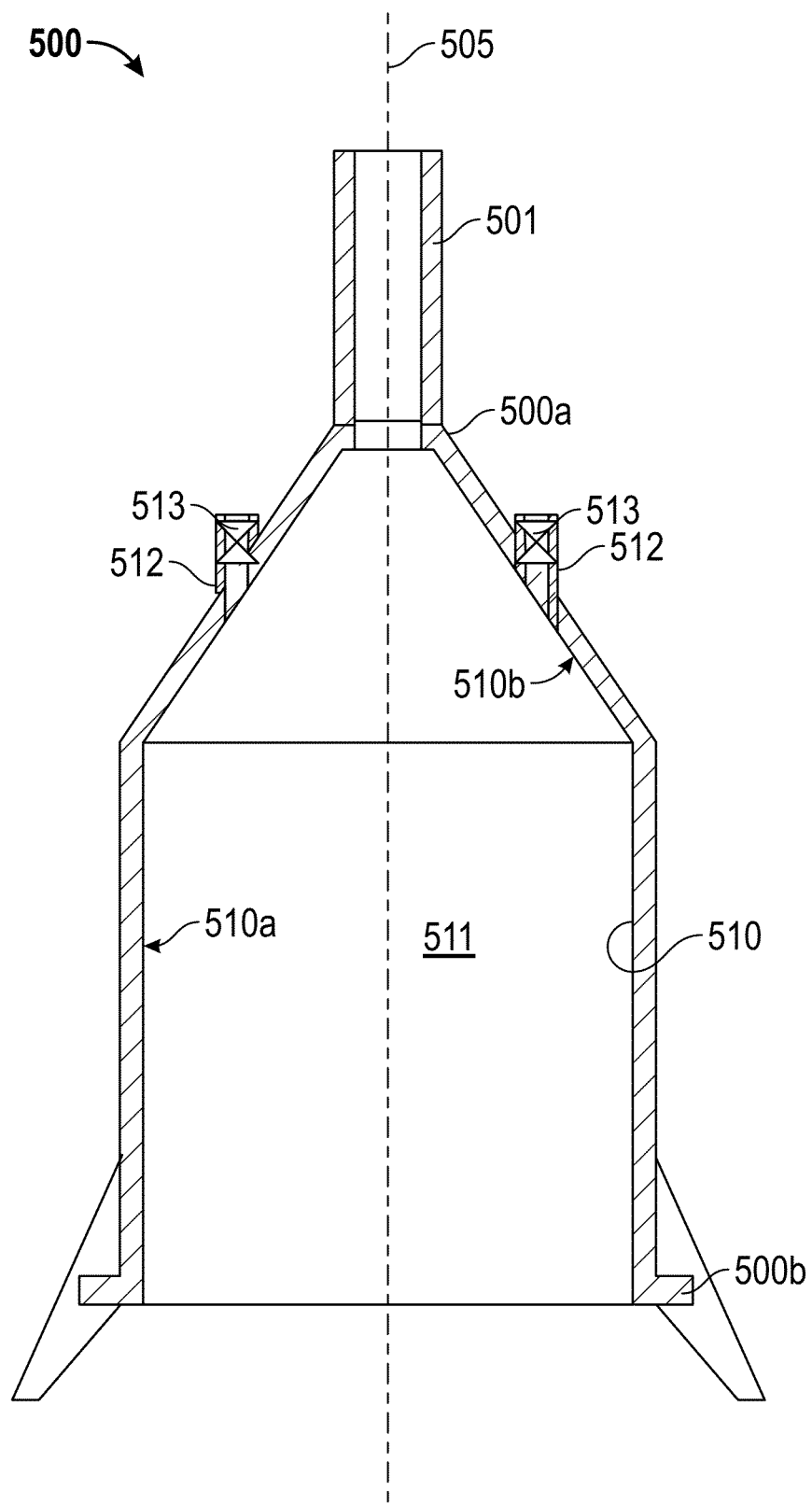
FIG. 10 is a schematic cross-sectional view of the hydrocarbon capture apparatus of FIG. 9.

Referring now to FIGS. 9 and 10, top hat 500 has a central axis 505, a first or upper end 500a coupled to the lower end of pipe string 501, a second or lower end 500b opposite end 500a, and a radially inner surface 510 defining a central flow passage 511 extending axially between ends 500a, b. Inner surface 510 includes a cylindrical surface 510a extending axially from lower end 500b and an inverted frustoconical surface 510b extending from upper end 500a to surface 510a. A pair of vents 512 extend axially upward from frustoconical surface 510b through top hat 500. Each vent 512 includes a valve 513 that controls the flow of fluids through vent 512 between passage 511 and the surrounding sea water.

As best shown in FIG. 9, top hat 500 functions as an inverted funnel positioned over hydrocarbon stream 111. In particular, emitted hydrocarbons flow upward into passage 511 at lower end 500b and are funneled into pipe string 501 with frustoconical surface 510b. The hydrocarbons in pipe string 501 are produced to a vessel the sea surface 102. Although a substantial portion of the emitted hydrocarbons may be captured by top hat 500 and passed through string 501 to the surface 102, it may not be possible to capture all of the discharged hydrocarbons due to a variety of factors including, without limitation, flow limitations of top hat 500 and/or string 501, capacity limitations of the surface vessel receiving the hydrocarbons from string 501, and hydrate formations within top hat 500 and/or string 501. Further, in some scenarios, valves 513 may be opened to allow some hydrocarbon fluids flowing through passage 511 to escape top hat 500. Consequently, a portion of the discharged hydrocarbons may flow from lower end 500b along the outside of top hat 500 and/or exit top hat 500 through vents 512.

Figure 11:
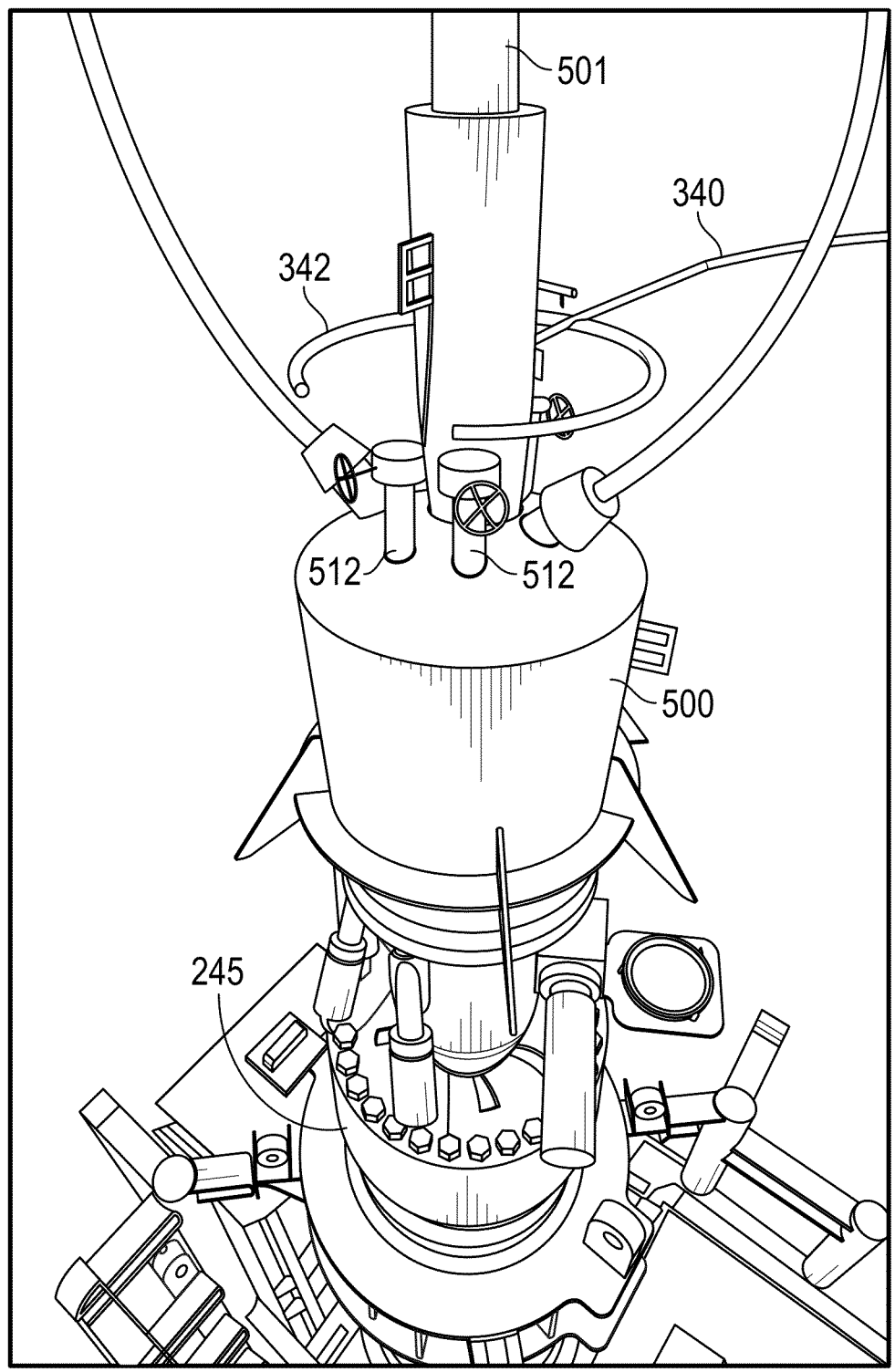
FIG. 11 is a perspective view of the dispersant injection wand of FIG. 6D deployed with a subsea remotely operated vehicle to inject dispersant into the hydrocarbon fluids flowing along the outside and through the vents of the capture apparatus of FIG. 9.
Figure 12:
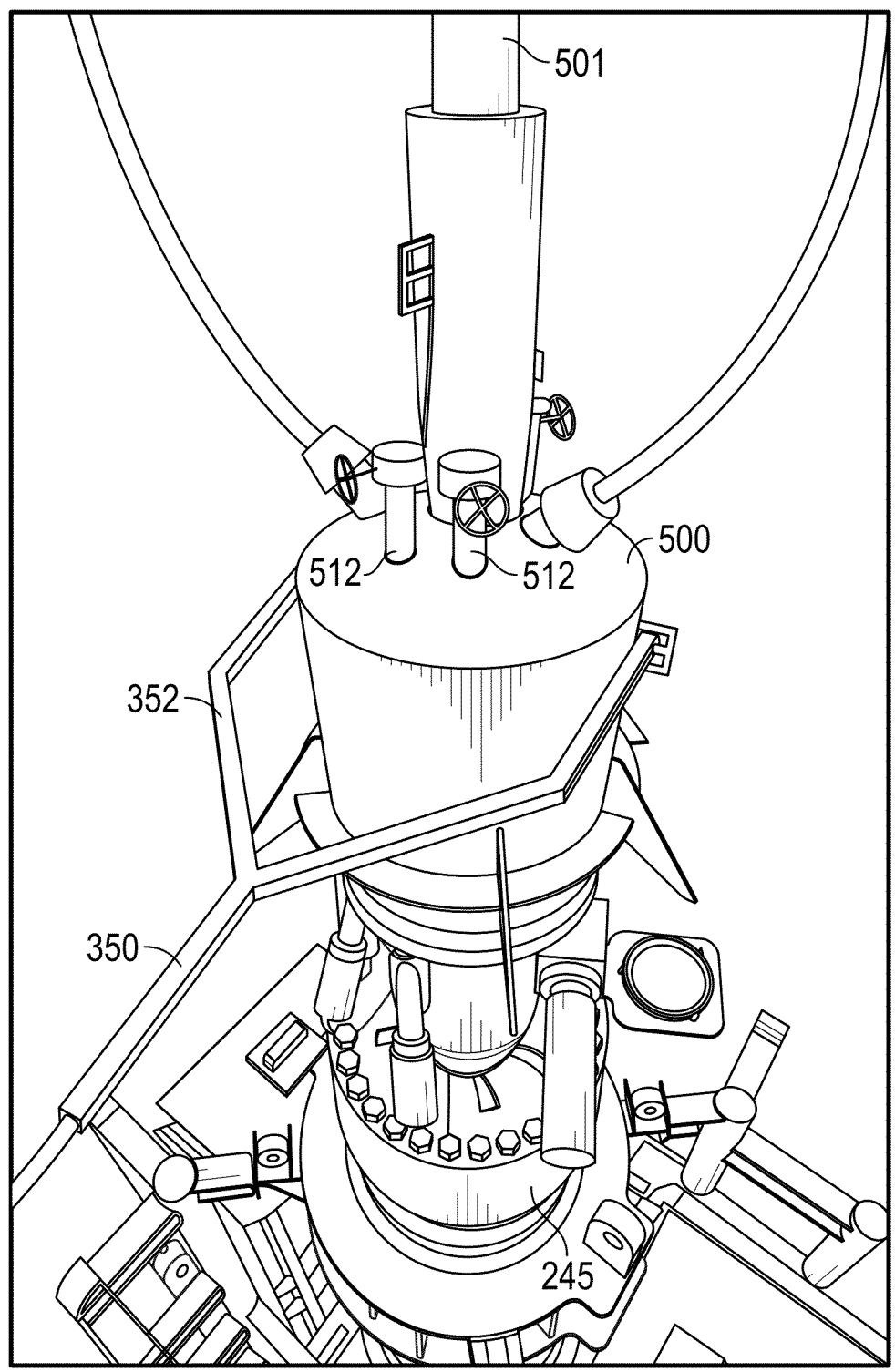
FIG. 12 is a perspective view of the dispersant injection wand of FIG. 6E deployed with a subsea remotely operated vehicle to inject dispersant into the hydrocarbon fluids flowing along the outside of the capture apparatus of FIG. 9.

Referring now to FIGS. 11 and 12, wands 340, 350 previously described and shown in FIGS. 6D and 6E, respectively, are particularly suited to inject dispersant into the hydrocarbon fluids that escape top hat 500. In FIG. 11, C-shaped distal portion 342 of wand 340 is positioned about top hat 500 axially above vents 512. Thus, wand 340 is positioned to inject dispersant into hydrocarbon fluids exiting through vents 512 and flowing along the outer surface of top hat 500. In FIG. 12, Y-shaped distal portion 352 of wand 350 is positioned about top hat 500 axially between lower end 500b and vents 512. Thus, wand 350 is positioned to inject dispersant into hydrocarbon fluids flowing along the outer surface of top hat 500 from lower end 500b. In general, wands 340, 350 may be held in position by a subsea ROV 190 or by being coupled to top hat 500. Thus, in this embodiment, wands 340, 350 and associated dispersant application devices are separate and distinct from top hat 500. Accordingly, ROVs 190 are employed to position and manipulate the dispersant application devices such that wands 340, 350 extend into the emitted hydrocarbon stream or plume. However, in other embodiments, the dispersant application device(s) may be part of or integral with the top hat (e.g., top hat 500)

Figure 13:
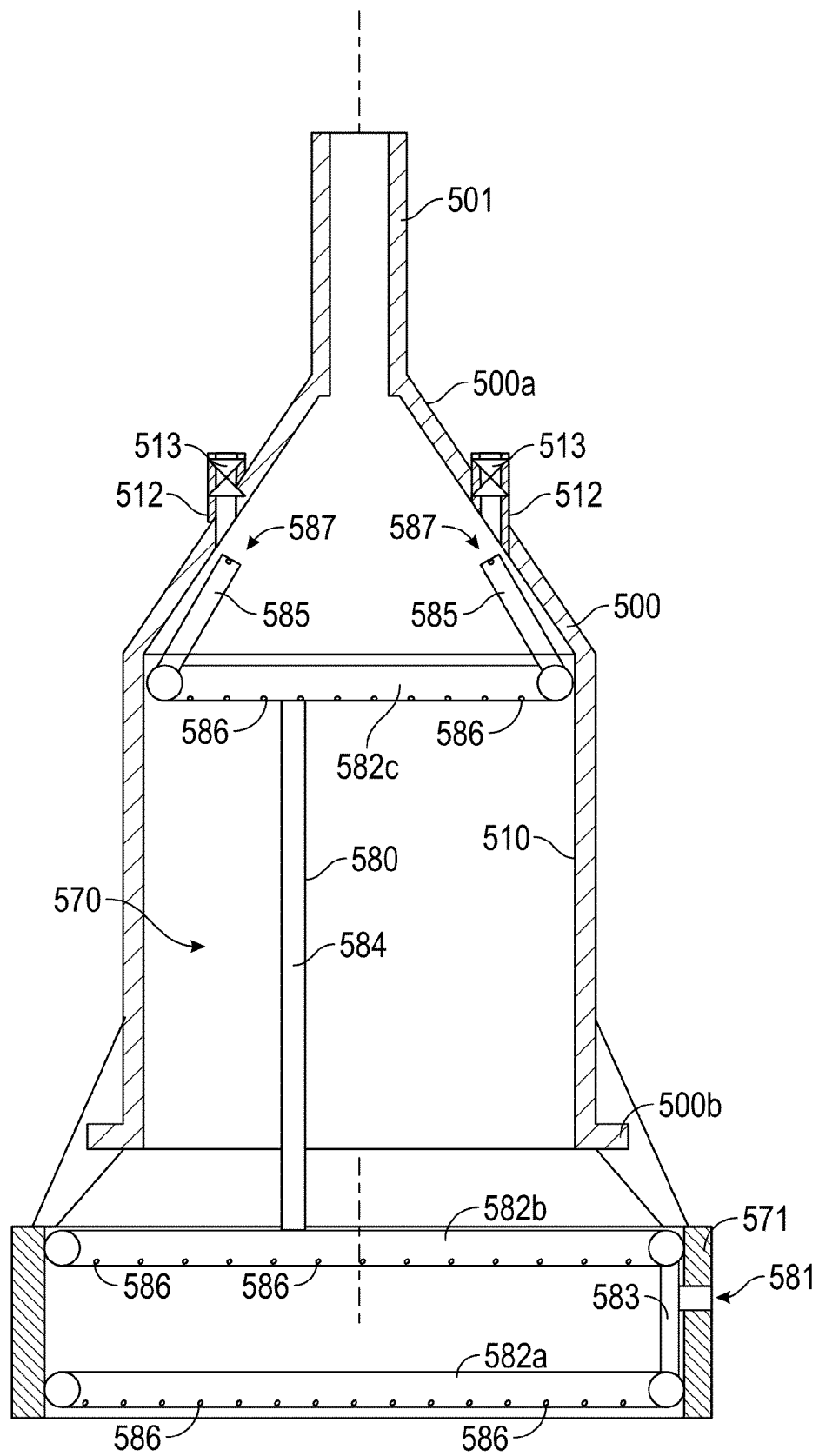
FIG. 13 is a schematic cross-sectional view of the hydrocarbon capture apparatus of FIG. 10 including a dispersant injection assembly.

Referring now to FIG. 13, top hat 500 as previously described is shown including an integral dispersant injection device or system 570. Injection system 570 includes an annular base 571 coupled to lower end 500b of top hat 500 and a dispersant flow line assembly 580 extending from base 571 into top hat 500. In this embodiment, assembly 580 includes a dispersant inlet 581 extending radially through base 571, a pair of axially-spaced annular tubulars 582a, b positioned within base 571, an annular tubular 582c disposed within top hat 500, a first dispersant carryover tubular 583 extending axially between tubulars 582a, b, a second dispersant carryover tubular 584 extending axially between tubulars 582b, c, and a pair of vent tubulars 585 extending from tubular 582c to vents 512. Each tubular 582a, b, c, 583, 584 is in fluid communication with inlet 581. In particular, dispersant supplied to inlet 581 flows into carryover tubular 583 to annular tubulars 582a, b, dispersant in annular tubular 582b is supplied to annular tubular 582c via carryover tubular 584, and dispersant within annular tubular 582c is supplied to vent tubulars 585. Each annular tubular 582a, b, c includes a plurality of circumferentially spaced dispersant injection nozzles 586, and each vent tubular 585 includes a dispersant injection nozzle 587 positioned at each vent 512. Thus, annular tubulars 582a, b are positioned to inject dispersant into hydrocarbons flowing through base 571, annular tubular 582c is positioned to inject dispersant into hydrocarbons flowing through top hat 500, and vent tubulars 585 are positioned to inject dispersant into hydrocarbons flowing through vents 512.

As previously described, most conventional dispersant techniques rely on the application of dispersants to the relatively spread out oil slick at the sea surface. However, embodiments described herein enable the direct injection of chemical dispersants into the hydrocarbon stream at its subsea source. Without being limited by this or any particular theory, injecting dispersant at the point of subsea hydrocarbon release offers the potential to greatly improve dispersant efficiency, as compared to spreading dispersant over an oil slick on the surface of the sea, by maximizing mixing of the dispersant and hydrocarbons before substantial diffusion of the hydrocarbons. For example, it is believed that direct subsea application of dispersants prior to substantial mixing of oil and sea water may reduce the volume of dispersant necessary for effective oil dispersion by up to 70%. In addition, injecting dispersant at the point of subsea hydrocarbon release offers the potential to minimize VOCs at the surface, enhance microbial digestion/breakdown of the hydrocarbons subsea, and enable continuous 24 hour application of dispersants over a range of weather conditions and sea states. Further, direct injection into "fresh" oil at the discharge site reduces and/or eliminates problems associated with dispersant application to weathered crude oil.

It should be appreciated that embodiments described herein may be used in combination with other subsea dispersant injection systems such the subsea autonomous dispersant injection systems described in U.S. Patent Application No. 61/445,357, entitled "Subsea Autonomous Dispersant Injection System and Methods" filed Feb. 22, 2011, which is hereby incorporated herein by reference in its entirety for all purposes.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for supplying a chemical dispersant to a subsea hydrocarbon discharge site, comprising:
a dispersant source and a dispersant pump configured to pump dispersant from the dispersant source;
a first flow line coupled to the pump;
a subsea dispersant distribution system coupled to the first flow line;
a dispersant injection device coupled to the distribution system and configured to inject dispersant from the dispersant source into a subsea hydrocarbon stream;
wherein the dispersant source comprises a dispersant storage tank disposed on a surface vessel;
wherein the first flow line extends subsea from the vessel to the dispersant distribution system; and
wherein the subsea dispersant distribution system comprises:
a subsea distribution panel hung from a lower end of the first flow line, wherein the distribution panel includes an inlet and a plurality of outlets;
a subsea manifold positioned at the sea floor, wherein the manifold includes a plurality of inlets and a plurality of outlets;
at least one flow line extending from the distribution panel to the manifold; and
a flow line extending from the manifold to the injection device.

2. The system of claim 1, wherein each outlet of the distribution panel includes a valve configured to control the flow of dispersant through the outlet of the distribution panel; and
wherein each outlet of the manifold includes a valve configured to control the flow of dispersant through the outlet of the manifold.

3. The system of claim 1, wherein a first plurality of flow lines extend from the distribution panel to the manifold, wherein each flow line of the first plurality of flow lines has a first end releasably connected to one outlet of the distribution panel and a second end releasably connected to one inlet of the manifold.

4. The system of claim 3, further comprising a second plurality of flow lines extending from the manifold, wherein each flow line of the second plurality of flow lines has a first end releasably connected to one outlet of the manifold and a second end configured to releasably connect to a dispersant injection device.

5. The system of claim 1, wherein the first flow line is coiled tubing mounted to a coiled tubing reel disposed on the vessel.

6. The system of claim 1, wherein the dispersant injection device includes a base and an elongate wand extending from the base;
wherein the wand includes at least one nozzle configured to inject dispersant into the subsea hydrocarbon stream.

7. The system of claim 6, wherein the wand has an end section distal the base with a geometry selected from straight, hook-shaped, C-shaped, and Y-shaped.

8. The system of claim 6, wherein the base includes a dispersant inlet and a valve configured to control the flow of dispersant through the inlet and the wand.

9. The system of claim 8, wherein the wand has a longitudinal axis, a base end coupled to the base, and a distal end opposite the base end;
wherein the wand is arcuate and includes a proximal section extending linearly from the base, a distal section extending linearly from the distal end, and a curved intermediate section extending between the proximal section and the distal section;
wherein the distal section includes a plurality of axially spaced nozzles, wherein each nozzle is oriented to inject dispersant away from distal end.

10. The system of claim 9, wherein each nozzle is oriented at an acute angle measured downward from the longitudinal axis in side view.

11. The system of claim 1, wherein the dispersant injection device is at least partially disposed within a hydrocarbon capture device configured to receive at least a portion of the hydrocarbon stream.

12. A method for injecting a chemical dispersant at a subsea hydrocarbon discharge site, comprising:
(a) storing a chemical dispersant in a storage tank at the sea surface;
(b) installing a dispersant distribution system on the sea floor;
(c) coupling a dispersant injection device to the dispersant distribution system; and
(d) pumping the dispersant from the storage tank through the distribution system to the injection device;
wherein the distribution system includes a manifold disposed on the sea floor;
wherein the manifold includes at least one dispersant inlet, a plurality of dispersant outlets, and a plurality of valves, wherein each valve controls the flow of dispersant through one of the plurality of outlets; and
wherein (d) comprises opening at least one valve with a subsea ROV.

13. The method of claim 12, further comprising:
(e) positioning the injection device to inject the dispersant into the hydrocarbon stream at the subsea discharge site.

14. The method of claim 13, wherein the dispersant injection device includes a base and an elongate wand extending from the base, the wand including at least one nozzle;
wherein (e) further comprises positioning the at least one nozzle in the hydrocarbon stream, flowing the dispersant through the wand, and injecting the dispersant through the at least one nozzle into the hydrocarbon stream.

15. The method of claim 14, further comprising:
exerting a downward force on the wand to counteract the upward force exerted on the wand by the hydrocarbon stream.

16. The method of claim 15, wherein the downward force is generated by the flow of dispersant through the at least one nozzle.

17. The method of claim 13, wherein the discharge site is a tubular or BOP stack extending upward from the sea floor;
wherein the wand has a longitudinal axis, a base end coupled to the base, and a distal end opposite the base end;
wherein the wand is arcuate and includes a proximal section extending linearly from the base, a distal section extending linearly from the distal end, and a curved intermediate section extending between the proximal section and the distal section;
wherein the distal section includes a plurality of axially spaced nozzles, wherein each nozzle is oriented to inject dispersant away from distal end.

18. The method of claim 17, wherein (e) comprises positioning the distal end of the wand inside the BOP stack or tubular.

19. The method of claim 17, wherein the plurality of nozzles are configured to generate a vortex.

20. The method of claim 17, wherein one or more of the plurality of nozzles are configured to create small droplets.

21. The method of claim 13, wherein (c) and (e) are performed with one or more subsea ROVs.

22. The method of claim 12, further comprising:
continuously pumping the dispersant from the storage tank through the distribution system to the injection device for at least a 24 hour period.

23. The method of claim 12, wherein the dispersant is Corexit® EC9500A or a surfactant.

24. A method for injecting a chemical dispersant into a subsea hydrocarbon stream, the method comprising:
(a) suspending a subsea distribution panel between the sea floor and the sea surface, wherein the distribution panel includes an inlet and a plurality of outlets;
(b) flowing a chemical dispersant to a subsea dispersant injection device, through the inlet and one of the outlets of the subsea distribution panel;
(c) positioning the device at least partially in the hydrocarbon stream; and
(d) injecting the dispersant into the hydrocarbon stream.

25. The method of claim 24, wherein (b) further comprises:
(b1) storing the dispersant at the sea surface; and
(b2) flowing the dispersant from the sea surface, through the inlet and one of the outlets of the subsea distribution panel, to the dispersant injection device.

26. The method of claim 24, wherein the dispersant injection device includes a base and an elongate wand extending from the base, the wand including at least one nozzle;
wherein (d) further comprises positioning the at least one nozzle in the hydrocarbon stream, flowing the dispersant through the wand, and injecting the dispersant through the at least one nozzle into the hydrocarbon stream.

27. The method of claim 26, further comprising:
exerting a downward force on the wand to counteract the upward force exerted on the wand by the hydrocarbon stream.

28. The method of claim 27, wherein the downward force is generated by the flow of dispersant through the at least one nozzle.

29. The method of claim 26, wherein the discharge site is a tubular or BOP stack extending upward from the sea floor;
wherein the wand has a longitudinal axis, a base end coupled to the base, and a distal end opposite the base end;
wherein the wand is arcuate and includes a proximal section extending linearly from the base, a distal section extending linearly from the distal end, and a curved intermediate section extending between the proximal section and the distal section;
wherein the distal section includes a plurality of axially spaced nozzles, wherein each nozzle is oriented to inject dispersant away from distal end.

30. The method of claim 29, wherein (d) comprises positioning the distal end of the wand inside the BOP stack or tubular.

31. The method of claim 29, wherein the plurality of nozzles are configured to generate a vortex.

* * * * *